US012645642B2

(12) United States Patent
Saito et al.

(10) Patent No.:  US 12,645,642 B2
(45) Date of Patent:  *Jun. 2, 2026

(54) METHOD AND SYSTEM FOR DELETING OBSOLETE FILES FROM A FILE SYSTEM

(71) Applicant: Google LLC, Mountain View, CA (US)

(72) Inventors: Yasushi Saito, Mountain View, CA (US); Sanjay Ghemawat, Mountain View, CA (US); Jeffrey Adgate Dean, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/794,474

(22) Filed: Aug. 5, 2024

(65) Prior Publication Data

US 2025/0077474 A1     Mar. 6, 2025

Related U.S. Application Data

(63) Continuation of application No. 18/239,475, filed on Aug. 29, 2023, now Pat. No. 12,056,089, which is a
(Continued)

(51) Int. Cl.
G06F 16/16          (2019.01)
G06F 16/11          (2019.01)
(Continued)

(52) U.S. Cl.
CPC ............ G06F 16/162 (2019.01); G06F 16/11 (2019.01); G06F 16/1748 (2019.01); G06F 16/182 (2019.01); G06F 16/215 (2019.01)

(58) Field of Classification Search
CPC .. G06F 16/128; G06F 16/182; G06F 11/1435; G06F 16/162; G06F 11/1453;
(Continued)

(56) References Cited

U.S. PATENT DOCUMENTS

| | | | |
|---|---|---|---|
| 5,333,315 A | 7/1994 | Saether et al. | |
| 5,421,007 A | 5/1995 | Coleman et al. | |

(Continued)

FOREIGN PATENT DOCUMENTS

| | | |
|---|---|---|
| CN | 101001148 A | 7/2007 |
| CN | 101316274 B | 12/2010 |

(Continued)

OTHER PUBLICATIONS

Bernstein, Chapter 5—Multiversion Concurrency Control, Concurrency Control and Recovery in Database Systems, Jan. 1, 1987, 24 pgs.

(Continued)

*Primary Examiner* — Hung T Vy
(74) *Attorney, Agent, or Firm* — Lerner David LLP

(57) ABSTRACT

A method for deleting obsolete files from a file system is provided. The method includes receiving a request to delete a reference to a first target file of a plurality of target files stored in a file system, the first target file having a first target file name. A first reference file whose file name includes the first target file name is identified. The first reference file is deleted from the file system. The method further includes determining whether the file system includes at least one reference file, distinct from the first reference file, whose file name includes the first target file name. In accordance with a determination that the file system does not include the at least one reference file, the first target file is deleted from the file system.

16 Claims, 6 Drawing Sheets

Related U.S. Application Data continuation of application No. 17/350,804, filed on Jun. 17, 2021, now Pat. No. 11,775,480, which is a continuation of application No. 16/268,149, filed on Feb. 5, 2019, now Pat. No. 11,055,259, which is a continuation of application No. 15/269,788, filed on Sep. 19, 2016, now Pat. No. 10,204,110, which is a continuation of application No. 13/909,021, filed on Jun. 3, 2013, now Pat. No. 9,449,006.

(60) Provisional application No. 61/655,452, filed on Jun. 4, 2012.

(51) Int. Cl.
  *G06F 16/174*        (2019.01)
  *G06F 16/182*        (2019.01)
  *G06F 16/215*        (2019.01)

(58) Field of Classification Search
  CPC .. G06F 11/1469; G06F 16/10; G06F 16/1748; G06F 16/11
  USPC .................................................. 707/687, 692
  See application file for complete search history.

(56) References Cited

U.S. PATENT DOCUMENTS

| | | | |
|---|---|---|---|
| 5,832,521 | A | 11/1998 | Klots et al. |
| 6,477,544 | B1 | 11/2002 | Bolosky et al. |
| 6,772,155 | B1 | 8/2004 | Stegelmann |
| 6,963,914 | B1 | 11/2005 | Breitbart et al. |
| 6,981,114 | B1 | 12/2005 | Wu et al. |
| 7,065,618 | B1 | 6/2006 | Ghemawat et al. |
| 7,334,004 | B2 | 2/2008 | Ganesh et al. |
| 7,363,326 | B2 | 4/2008 | Margolus |
| 7,430,570 | B1 | 9/2008 | Srinivasan et al. |
| 7,567,973 | B1 | 7/2009 | Burrows et al. |
| 7,774,469 | B2 | 8/2010 | Massa et al. |
| 8,402,198 | B1 | 3/2013 | de la Iglesia et al. |
| 8,627,135 | B2 | 1/2014 | Aron et al. |
| 8,719,432 | B1 | 5/2014 | Vermeulen et al. |
| 8,788,530 | B2 * | 7/2014 | Lacapra ................. G06F 16/182 707/783 |
| 8,806,323 | B2 | 8/2014 | Samavedula |
| 8,838,539 | B1 | 9/2014 | Ashcraft et al. |
| 8,850,130 | B1 | 9/2014 | Aron et al. |
| 8,949,208 | B1 | 2/2015 | Xu et al. |
| 9,678,968 | B1 * | 6/2017 | Taylor ................. G06F 11/1435 |
| 2002/0133507 | A1 | 9/2002 | Holenstein et al. |
| 2002/0178249 | A1 | 11/2002 | Prabakaran et al. |
| 2003/0065708 | A1 | 4/2003 | Jacobs et al. |
| 2003/0132855 | A1 | 7/2003 | Swan |
| 2005/0015404 | A1 | 1/2005 | Cherkasova |
| 2005/0066118 | A1 | 3/2005 | Perry |
| 2005/0149627 | A1 | 7/2005 | Schreter |
| 2005/0177590 | A1 | 8/2005 | Chen et al. |
| 2005/0192991 | A1 | 9/2005 | Nomoto |
| 2005/0210218 | A1 | 9/2005 | Hoogterp |
| 2006/0047895 | A1 | 3/2006 | Rowan |
| 2007/0016546 | A1 * | 1/2007 | De Vorchik ............ G06F 16/13 |
| 2007/0050429 | A1 | 3/2007 | Goldring et al. |
| 2007/0183224 | A1 | 8/2007 | Erofeev |
| 2007/0219999 | A1 | 9/2007 | Richey et al. |
| 2008/0034003 | A1 | 2/2008 | Stakutis et al. |
| 2008/0071853 | A1 | 3/2008 | Mosler et al. |
| 2008/0096662 | A1 | 4/2008 | Kuwahara et al. |
| 2008/0133616 | A1 * | 6/2008 | Willoughby ........ G06F 11/3672 |
| 2008/0181107 | A1 | 7/2008 | Moorthi et al. |
| 2008/0201366 | A1 | 8/2008 | Devarakonda |
| 2008/0243879 | A1 | 10/2008 | Gokhale et al. |
| 2008/0250072 | A1 * | 10/2008 | Nguyen .............. G06F 11/1435 |
| 2008/0263305 | A1 * | 10/2008 | Shu ........................ G06F 3/0604 711/170 |
| 2009/0070330 | A1 | 3/2009 | Hwang et al. |

| | | | |
|---|---|---|---|
| 2009/0327642 | A1 | 12/2009 | Ogihara et al. |
| 2010/0023520 | A1 | 1/2010 | Barboy et al. |
| 2010/0077165 | A1 | 3/2010 | Lu et al. |
| 2010/0281013 | A1 | 11/2010 | Graefe |
| 2011/0196664 | A1 | 8/2011 | Zunger et al. |
| 2012/0036161 | A1 * | 2/2012 | Lacapra .................. G06F 16/13 707/781 |
| 2012/0059911 | A1 * | 3/2012 | Randhawa ............. G16H 40/67 709/219 |
| 2012/0151272 | A1 | 6/2012 | Behrendt et al. |
| 2012/0159102 | A1 | 6/2012 | Kan |
| 2012/0303791 | A1 | 11/2012 | Calder et al. |
| 2013/0060742 | A1 | 3/2013 | Chang et al. |
| 2013/0110774 | A1 | 5/2013 | Shah et al. |
| 2013/0204991 | A1 | 8/2013 | Skjolsvold et al. |
| 2013/0318129 | A1 | 11/2013 | Vingralek et al. |
| 2013/0346365 | A1 | 12/2013 | Kan et al. |
| 2014/0007239 | A1 * | 1/2014 | Sharpe .................. G06F 16/183 726/24 |
| 2015/0012497 | A1 | 1/2015 | Clark et al. |

FOREIGN PATENT DOCUMENTS

| | | |
|---|---|---|
| CN | 101854392 B | 11/2012 |
| WO | 2011100366 A2 | 8/2011 |
| WO | 2012040391 A1 | 3/2012 |

OTHER PUBLICATIONS

Brief Communication of Preliminary Opinion before Oral Proceedings for European Patent Application No. 13728658.9 dated Nov. 4, 2020. 6 pages.

Cahill, Seriallizable Isolation for Snapshot Databases, Jun. 9-12, 2008, 10 pgs.

Chang, Bigtable: A Distributed Storage System for Structured Data, Google, Nov. 2006, 14 pgs, research.google.com/archive/bigtable. html.

Elmasri, Chapter 20—Physical Database Design and Tuning, Fundamentals of Database Systems, 6th Ed., Addison-Wesley, Jan. 1, 2011, 16 pgs.

Extended European Search Report for European Patent Application No. 21201492.2 dated Jan. 20, 2022. 7 pages.

Ferro, A Critique of Snapshot Isolation, Yahoo Research, Apr. 10-13, 2012, 14 pgs.

Garcia-Molina, Chapter 18—Concurrency Control, Database Systems: The Complete Book, Prentice-Hall, Jan. 1, 2002, 72 pgs.

Garcia-Molina, Chapter 1—The Worlds of Database Systems, Database Systems: The Complete Book, Prentice Hall, Jan. 1, 2002, 21 pgs.

Ghemawat, The Google File System, Proc. of the ACM Symposium on Operating Systems Principles, Oct. 19, 2003, pp. 1-15.

Google Inc., International Preliminary Report on Patentability, PCT/US2013/044105, dated Dec. 9, 2014, 4 pgs.

Google Inc., International Preliminary Report on Patentability, PCT/US2013/044105, Dec. 9, 2014, 4 pgs.

Google Inc., International Preliminary Report on Patentability, PCT/US2013/044163, dated Dec. 9, 2014, 9 pgs.

Google Inc., International Preliminary Report on Patentability, PCT/US2013/044163, Dec. 9, 2014, 9 pgs.

Google Inc., International Search Report and Written Opinion, PCT/US2013/042063, dated Dec. 13, 2013, 16 pgs.

Google Inc., International Search Report and Written Opinion, PCT/US2013/044105, dated Nov. 14, 2013, 6 pgs.

Google Inc., International Search Report and Written Opinion, PCT/US2013/044163, dated May 9, 2014, 11 pgs.

Google Inc., International Search Report and Written Opinion, PCT/US2013/044163, May 9, 2014, 11 pgs.

Google Inc., Invitation to Pay Additional Fees, PCT/US2013/042063, dated Jul. 30, 2013, 8 pgs.

Google Inc., Invitation to Pay Additional Fees, PCT/US2013/042063, Jul. 30, 2013, 8 pgs.

International Search Report and Written Opinion dated Dec. 13, 2013, received in International Application No. PCT/US2013/042063, which corresponds to U.S. Appl. No. 13/898,411, 17 pages (Jeffrey Adgate Dean).

(56) References Cited

OTHER PUBLICATIONS

International Search Report and Written Opinion dated Nov. 14, 2013, received in International Application No. PCT/US2013/044105, which corresponds to U.S. Appl. No. 13/909,021, 7 pages (Yasushi Saito).

Ivanova, Self-Organizing Strategies for a Column-Store Database, Proc. 11th Int'l Conf. on Extending Database Technology Advances in Database Technology, EDBT'08, Mar. 25, 2008, pp. 157-168.

Ivanova, Self-Organizing Strategies for a Column Store Database, Proc. of the 11th International Conference on Extending Database Technology Advances in Database Technology, EDBT'08, Mar. 25, 2008, pp. 157-168.

Minutes of the Oral Proceedings before the Examining Division for European Patent Application No. 13728658.9 dated Nov. 27, 2020. 5 pages.

Notification of First Office Action CN 201380037792.3, dated Sep. 28, 2016, 11 pgs.

Office Action for European Patent Application No. 13728658.9 dated Aug. 13, 2019. 5 pages.

Summons to Attend Oral Proceedings for European Patent Application No. 13728658.9 dated Jun. 19, 2020. 7 pages.

Thomson, Calvin: Fast Distributed Transactions for Partitioned Database Systems, May 20-24, 2012, 12 pgs.

Zhang, Supporting Multi-Row Distributed Transactions with Global Snapshot Isolation Using Bare-Bones Hbase, 11th IEEE/ACM Int'l Conf. on Grid Computing, Piscataway, NJ, Oct. 25, 2010, pp. 177-184.

* cited by examiner

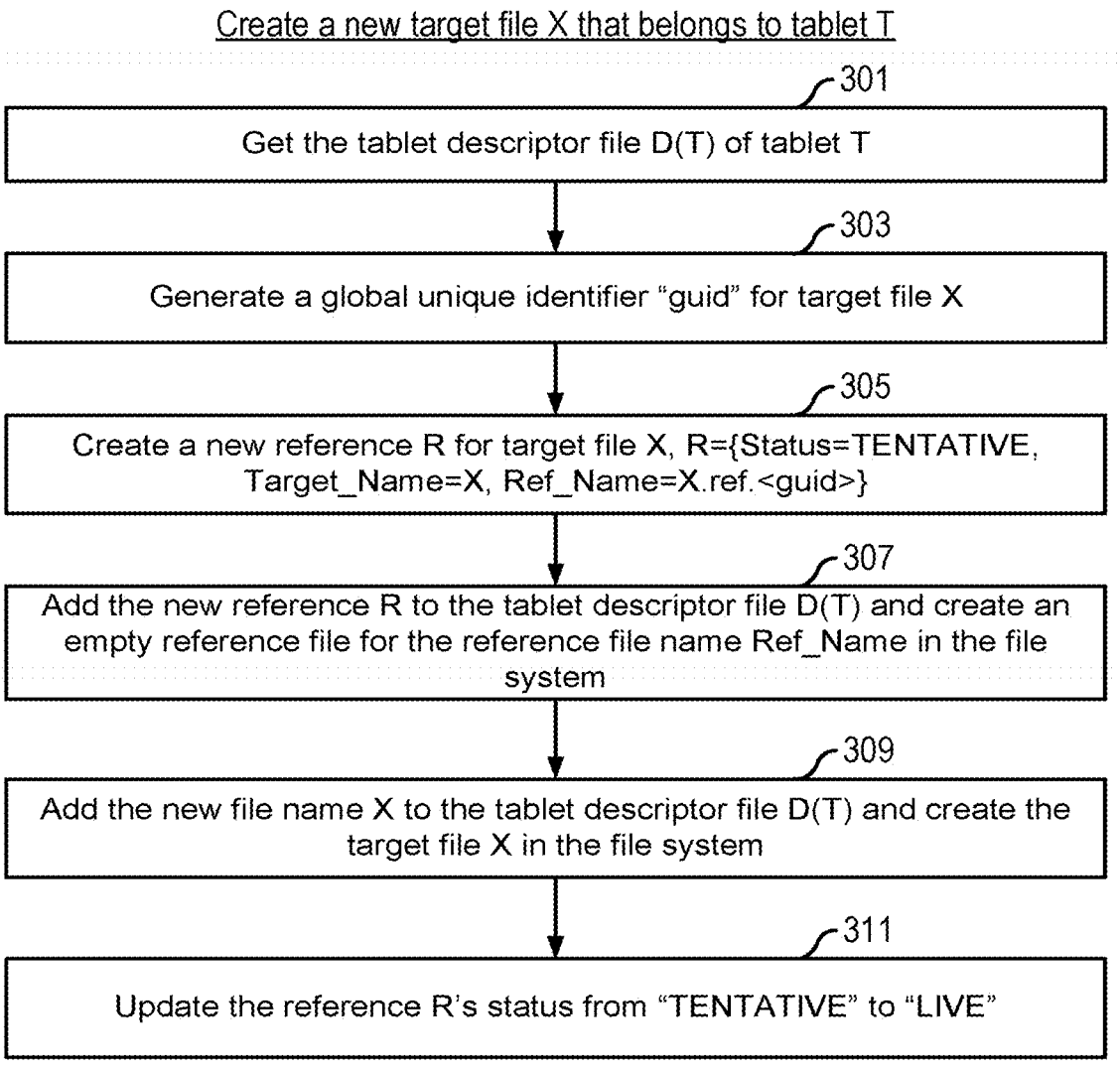

Create a new target file X that belongs to tablet T

301

Get the tablet descriptor file D(T) of tablet T

303

Generate a global unique identifier "guid" for target file X

305

Create a new reference R for target file X, R={Status=TENTATIVE, Target_Name=X, Ref_Name=X.ref.<guid>}

307

Add the new reference R to the tablet descriptor file D(T) and create an empty reference file for the reference file name Ref_Name in the file system

309

Add the new file name X to the tablet descriptor file D(T) and create the target file X in the file system

311

Update the reference R's status from "TENTATIVE" to "LIVE"

FIG. 3A

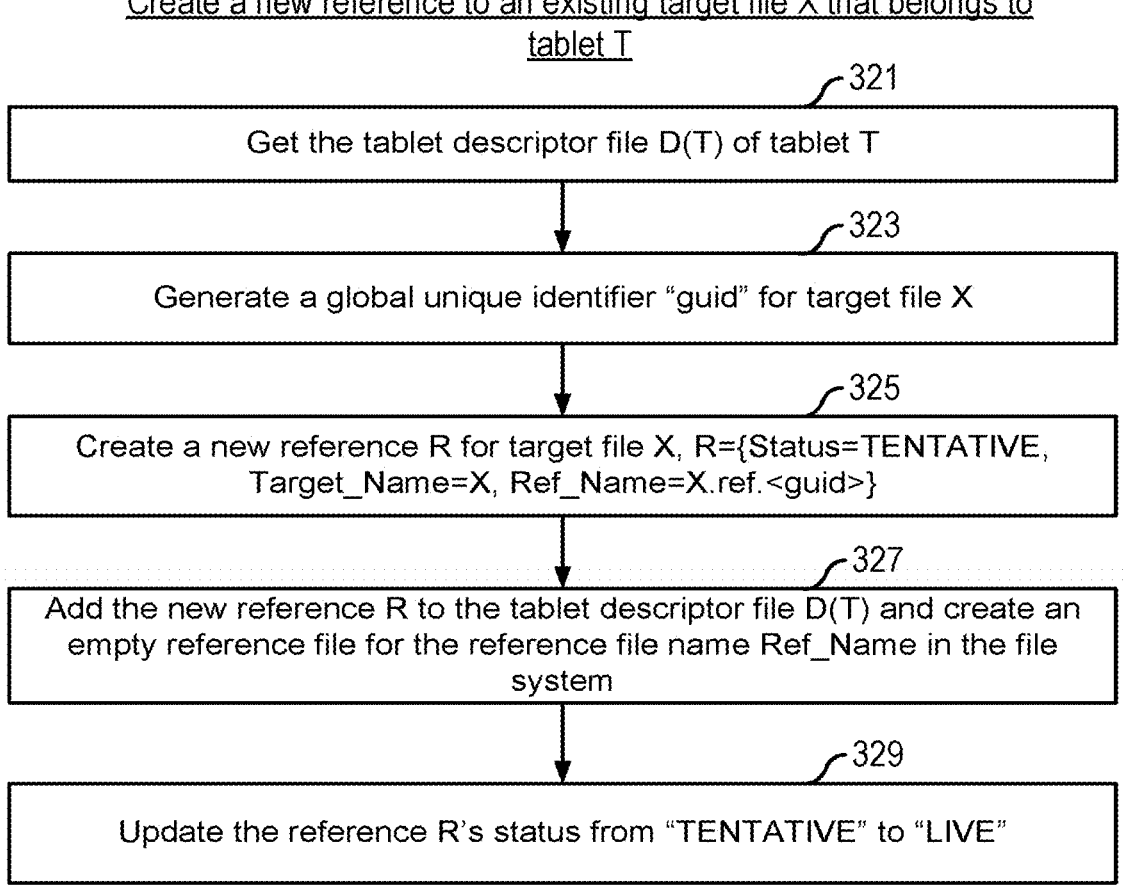

Create a new reference to an existing target file X that belongs to tablet T

┌─ 321
Get the tablet descriptor file D(T) of tablet T

┌─ 323
Generate a global unique identifier "guid" for target file X

┌─ 325
Create a new reference R for target file X, R={Status=TENTATIVE, Target_Name=X, Ref_Name=X.ref.<guid>}

┌─ 327
Add the new reference R to the tablet descriptor file D(T) and create an empty reference file for the reference file name Ref_Name in the file system ┌─ 329
Update the reference R's status from "TENTATIVE" to "LIVE"

FIG. 3B

Remove a reference to an existing target file X that belongs to tablet T

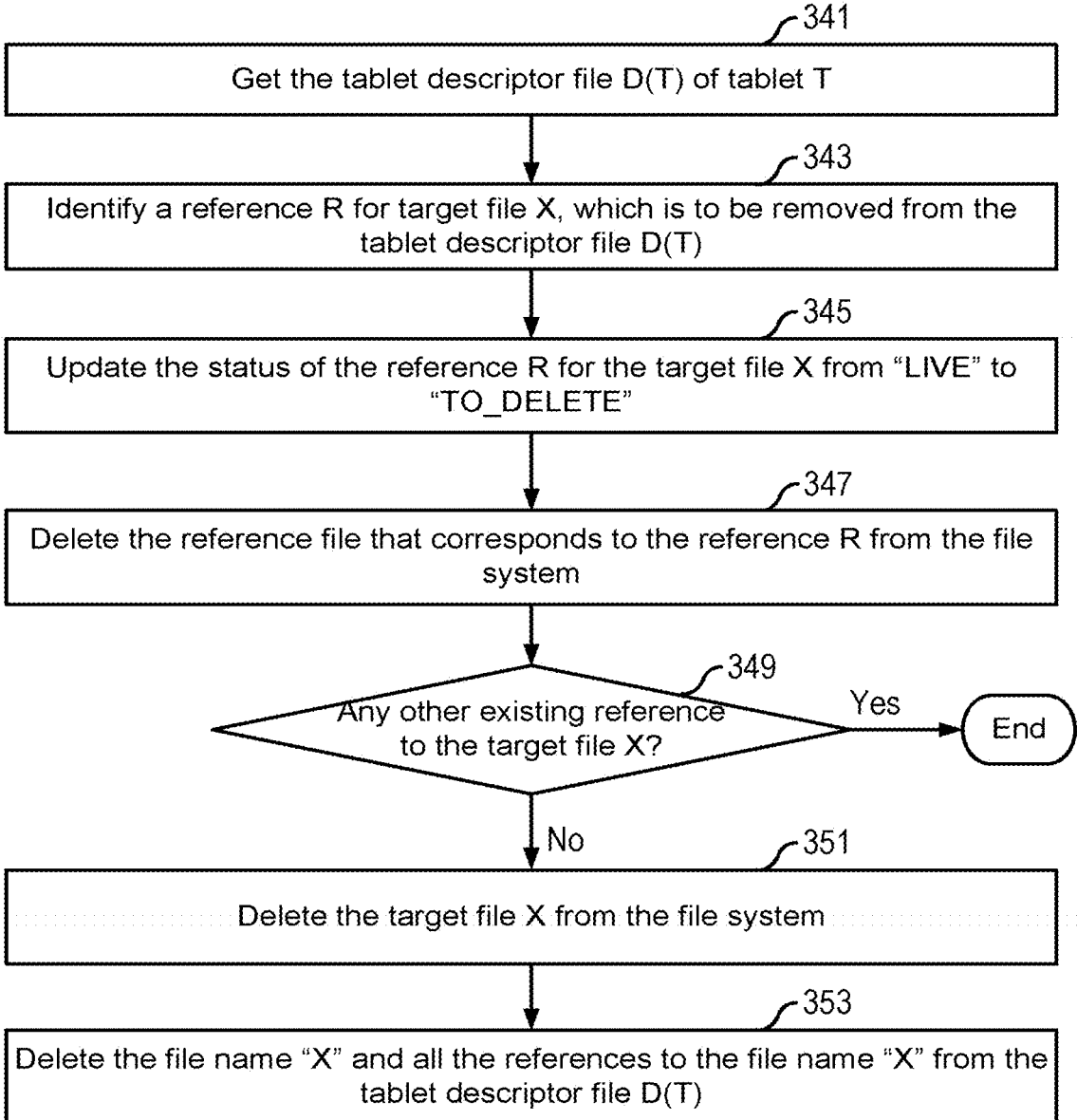

341

Get the tablet descriptor file D(T) of tablet T

343

Identify a reference R for target file X, which is to be removed from the tablet descriptor file D(T)

345

Update the status of the reference R for the target file X from "LIVE" to "TO_DELETE"

347

Delete the reference file that corresponds to the reference R from the file system

349

Any other existing reference to the target file X?

Yes

End

No

351

Delete the target file X from the file system

353

Delete the file name "X" and all the references to the file name "X" from the tablet descriptor file D(T)

FIG. 3C

METHOD AND SYSTEM FOR DELETING OBSOLETE FILES FROM A FILE SYSTEM

RELATED APPLICATIONS

This application is a continuation of U.S. application Ser. No. 18/239,475, filed Aug. 29, 2023, which is a continuation of U.S. application Ser. No. 17/350,804, filed Jun. 17, 2021, now issued U.S. Pat. No. 11,775,480, which is a continuation of U.S. application Ser. No. 16/268,149, filed Feb. 5, 2019, now issued U.S. Pat. No. 11,055,259, which is a continuation of U.S. application Ser. No. 15/269,788, filed Sep. 19, 2016, now issued U.S. Pat. No. 10,204,110, which is a continuation of U.S. application Ser. No. 13/909,021, filed Jun. 3, 2013, entitled "Method and System for Deleting Obsolete Files from a File System," now issued U.S. Pat. No. 9,449,006, which claims priority to U.S. Provisional Application No. 61/655,452, filed Jun. 4, 2012, entitled "Method and System for Deleting Obsolete Files from a File System," both of which are incorporated by reference herein in their entirety.

This application is related to U.S. application Ser. No. 13/898,411, filed May 20, 2013, entitled "Organizing Data in a Distributed Storage System," which is incorporated by reference herein in its entirety.

TECHNICAL FIELD

The disclosed implementations relate generally to the management of a file system, and in particular, to system and method for deleting obsolete files from a file system.

BACKGROUND

A file system in a computer system is used for managing data stored in a storage device. Typically, the data is organized into many data files and each data file is stored in a particular directory of the file system. Different data files in the file system usually operate on their own such that the addition or removal of one data file in the file system has little, if any, impact on the other data files. Compared with a file system, a database system also deals with a collection of data. But the data in the database system is often organized into many inter-related data records within one or more data structures (e.g., tables). In response to a query, the database system identifies within different tables a set of data records that satisfy the query and return the set of records or a derivative thereof as a response to the query. Similarly, the deletion of a data record from one table may trigger the deletion of a data record from another table. Currently, the line separating the file system from the database system is becoming increasingly blurry because data records in the database system often include references or pointers to different data files in the file system. As a result, an update to the database system may cause an update to the file system.

SUMMARY

In accordance with some implementations described below, a method performed by a computer server for deleting obsolete files from a file system is provided. The method includes: receiving a request to delete a reference to a target file in a file system from a file reference data structure, wherein the file reference data structure includes a plurality of target file names and a plurality of reference file names; identifying a reference file name in the file reference data structure, wherein the reference file name includes a file name of the target file in the file system; deleting a reference file from the file system, wherein the reference file has the identified reference file name; checking whether the file system includes at least one reference file whose file name matches the file name of the target file in the file system; if there is no such reference file in the file system: deleting the target file from the file system; and deleting the file name of the target file in the file system from the file reference data structure.

In accordance with some implementations described below, a computer system for deleting obsolete files from a file system includes one or more processors; memory; and a plurality of program modules, wherein the plurality of program modules are stored in the memory and to be executed by the one or more processors. The plurality of program modules include instructions for: receiving a request to delete a reference to a target file in a file system from a file reference data structure, wherein the file reference data structure includes a plurality of target file names and a plurality of reference file names; identifying a reference file name in the file reference data structure, wherein the reference file name includes a file name of the target file in the file system; deleting a reference file from the file system, wherein the reference file has the identified reference file name; checking whether the file system includes at least one reference file whose file name matches the file name of the target file in the file system; if there is no such reference file in the file system: deleting the target file from the file system; and deleting the file name of the target file in the file system from the file reference data structure.

In accordance with some implementations described below, a non-transitory computer readable-storage medium stores one or more programs for execution by one or more processors of a computer system that includes one or more processors and memory for deleting obsolete files from a file system. The one or more program modules include instructions: receiving a request to delete a reference to a target file in a file system from a file reference data structure, wherein the file reference data structure includes a plurality of target file names and a plurality of reference file names; identifying a reference file name in the file reference data structure, wherein the reference file name includes a file name of the target file in the file system; deleting a reference file from the file system, wherein the reference file has the identified reference file name; checking whether the file system includes at least one reference file whose file name matches the file name of the target file in the file system; if there is no such reference file in the file system: deleting the target file from the file system; and deleting the file name of the target file in the file system from the file reference data structure.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

FIG. 3A is a flow chart illustrating how to create a new target file that belongs to a tablet in accordance with some implementations.

FIG. 3B is a flow chart illustrating how to create a new reference to an existing target file that belongs to a tablet in accordance with some implementations.

FIG. 3C is a flow chart illustrating how to remove a reference to an existing target file that belongs to a tablet in accordance with some implementations.

DETAILED DESCRIPTION

Figure 1:
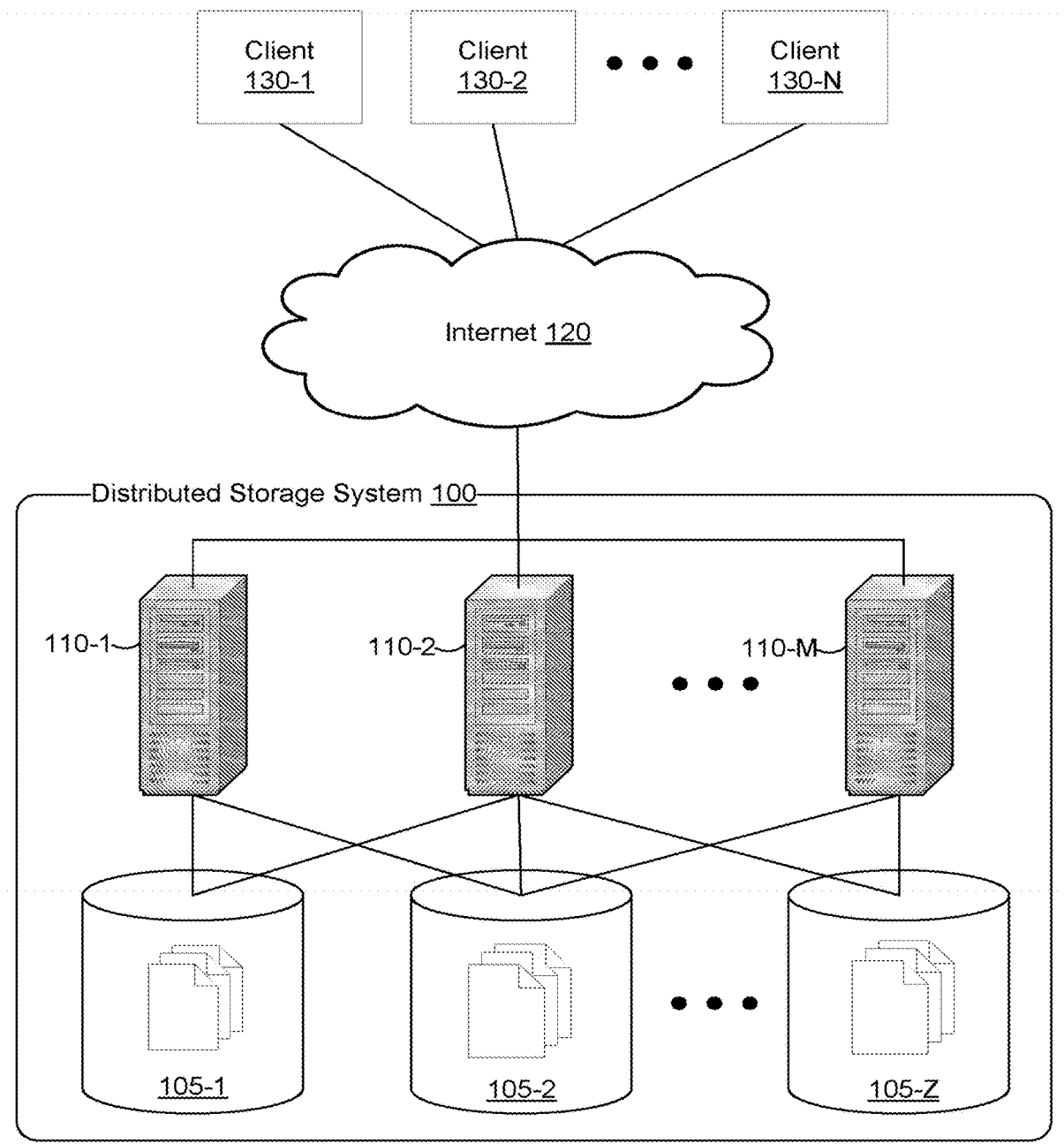
FIG. 1 is a block diagram illustrating how clients interact with a distributed storage system including a plurality of servers and databases in accordance with some implementations.

FIG. 1 is a block diagram illustrating how clients (130-1, 130-2, 130-N) interact with a distributed storage system 100 including a plurality of servers (110-1, 110-2, 110-M) and storage devices (105-1, 105-2, 105-Z) in accordance with some implementations. Both the clients 130 and the distributed storage system 100 are connected to the Internet 120. In some implementations, a client is a desktop/laptop computer through which an end user accesses services on the Internet, e.g., checking emails or playing on-line games, etc. In some other implementations, the client is a computer server itself that offers on-line services. For example, the client is a web server that provides on-line video streaming service to end users and it uses the distributed storage system 100 for hosting a large amount of video streams. On behalf of end users, the web server may send requests to the distributed storage system 100 for the user-requested video streams and return them to the requesting end users.

As a distributed storage system, the system 100 may include multiple data centers located at different geographic regions (e.g., one on the East Coast of the United States and another one on the West Coast of the United States) or even across the world. A data access request submitted to the distributed storage system 100 is received and processed by one of the servers 110 (usually the one that is geographically close to the source of the request). Within the distributed storage system 100, the server identifies one or more storage devices 105 that have the requested data and returns the requested data to the requesting client. Note that the client-requested data may be stored in the data storage devices at the same data center as the server or in the data storage devices at another data center remote from the server. A data update request (e.g., adding a video stream file to the distributed storage system or deleting a video stream file from the distributed storage system) submitted to the distributed storage system 100 may cause delete operations at one or more storage devices that store the video stream file.

In some implementations, data within a storage device 105 is organized into tablets to combine the benefit of a file system and that of a database system. For example, the storage device 105 includes a table-like data structure including multiple rows, each row including data associated with a user account of an on-line service and one or more pointers or references to files managed by a file system associated with the storage device 105. A tablet is a data unit including one or more rows (or partial rows) that associated a file in the file system with a particular entry in the tablet.

Figure 2:
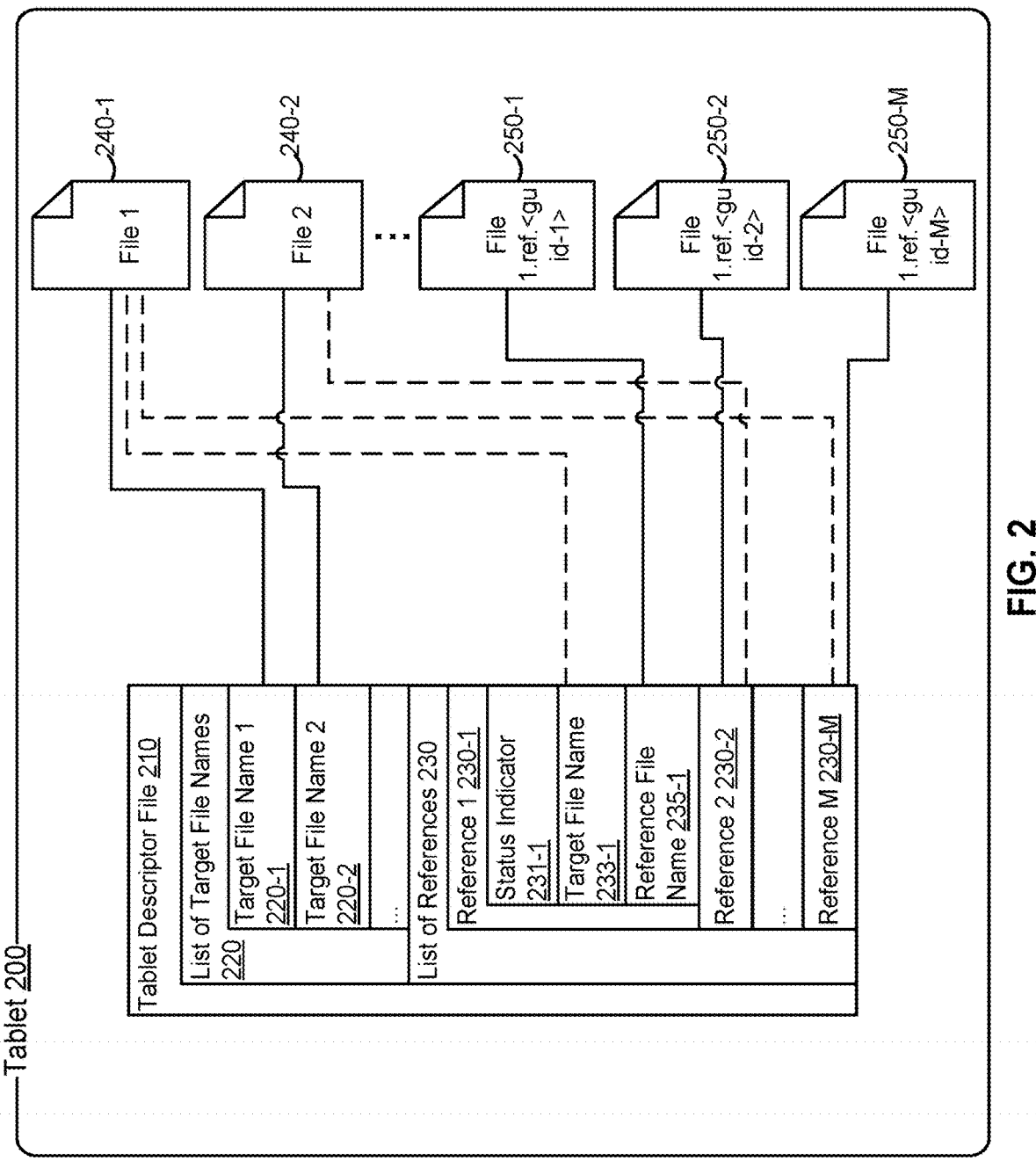
FIG. 2 is a block diagram illustrating the components of a tablet in accordance with some implementations.

FIG. 2 is a block diagram illustrating the components of a tablet 200 in accordance with some implementations. For simplicity, this exemplary tablet 200 focuses on the relationship between a tablet descriptor file 210 and a plurality of files referenced by the tablet descriptor file 210. In some implementations, the tablet descriptor file 210 is also a file managed by the file system. In some other implementations, the tablet descriptor file 210 is a specific data structure designed for hosting the file referencing data.

In some implementations, files associated with the tablet descriptor file 210 are divided into two groups: a group of target files such as files 240-1 and 240-2 and a group of reference files 250-1, 250-2, and 250-M. A target file corresponds to a file that has some data (e.g., an email message or a segment of a video stream) managed by a storage device in connection with an on-line service. A reference file corresponds to a file in the file system that represents a reference to a target file, which may be generated in response to a data access request from a particular client to the distributed storage system 100. Accordingly, the tablet descriptor file 210 includes a list of target file names 220 and a list of references 230. Each file name (220-1, 220-2) in the list of target file names 220 identified a target file (240-1, 240-2) in the file system. In some implementations, the file name includes a directory path to the target file in the file system.

A reference 230-1 in the list of references 230 further includes a status indicator 231-1, a target file name 233-1, and a reference file name 235-1. The status indicator may have one of multiple attributes indicating that the current status of a reference file associated with the reference. For example, the status indicator of a reference file that has been generated in the file system but whose corresponding reference is still being generated in the tablet descriptor file 210 is "TENTATIVE." After the corresponding reference is generated in the tablet descriptor file 210, the status indicator changes from "TENTATIVE" to "LIVE," indicating the completion of generating the reference. In response to a request for deleting the reference and before the deletion of the reference from the tablet descriptor file 210, the status indicator changes from "LIVE" to "TO-DELETE." The target file name 233-1 identifies a target file in the file system and it is the same as the corresponding target file name 220-1 in the list of target file names 220 (as indicated by the dashed-line between the target file name 233-1 and the target file 240-1). The reference file name 235-1 identifies a reference file 250-1 in the file system. In some implementations, there is a predefined naming convention for the reference file name 235-1. As shown in FIG. 2, the file name of the reference file 250-1 includes three components: the file name of the corresponding target file 240-1, a text string ".ref." and a unique identifier <guid-1>. In some implementations, the unique identifier further includes one or more of a current timestamp of the distributed storage system 100, an IP address or the like associated with a storage device 105 or a server 110 or both.

In some implementations, a reference 230-1 is generated in the list of references 230 in connection with the creation of a target file 240-1 in the file system because the creation of the target file 240-1 is usually triggered by a client access request for the data in the target file 240-1. In this case, the reference 230-1 is typically the first reference in the tablet descriptor file 210 for the target file 240-1. In addition to the reference 230-1, a reference file 250-1 is generated in the file system. In some implementations, the reference file 250-1 is an empty file because its existence is to indicate that there is at least one reference to the target file 240-1. In response to another client access request for the data in the target file 240-1, a new reference 230-M is generated in the list of references 230 and a new reference file 250-M is generated in the file system, indicating that one target file may be referenced for multiple times by different clients and is therefore associated with multiple reference files in the file system.

Of course, it is also possible that a target file 240-2 may be referenced by only one client and therefore has only one reference file 250-2. It should be noted that the reference entry 230-2 in the list of references 230 may or may not be the entry corresponding to the creation of the target file 240-2. For example, a target file may, at some point, be referenced by multiple clients and has therefore multiple references in the tablet descriptor file. But as time goes on, many references (including the one associated with the creation of the target file 240-2) may be deleted such that there is only one reference 230-2 in the list of references 230 for the target file 240-2. As will be described below, a deletion of the reference 230-2 will trigger the deletion of the target file 240-2 because it has no active reference in the tablet descriptor file 210, which indicates that the target file 240-2 and the reference file 250-2 should be cleaned up from the file system so that the file system can reclaim the space occupied by the two files for other uses.

FIG. 3A is a flow chart illustrating how to create a new target file that belongs to a tablet T in accordance with some implementations. Assuming that the tablet T has been created before, the first step is for a server to get (301) a tablet descriptor file D(T) associated with the tablet T. For the new target file X, the server generates (303) a global unique identifier "guid." In some implementations, the global unique identifier "guid" may include the server's IP address, a current timestamp or the like generated by the server such that the global unique identifier "guid" is unique within the distributed storage system 100. The server then creates (305) a new reference R for the target file X, which may include the following attributes {Status=TENTATIVE, Target_Name=X, Ref_Name=X.ref.<guid>}. As noted above, the reference R's status indicator is set to "TENTATIVE" because neither the target file X and the corresponding reference file has been created in the file system yet.

Next, the server adds (307) the new reference R to the tablet descriptor file D(T) and creates an empty reference file in the file system using the reference file name Ref_Name. The server then adds (309) the new target file name X to the list of target file names of the tablet descriptor file D(T) and creates the target file X in the file system. After the creation of the target file X and the reference file Ref_Name in the file system, the server updates (311) the reference R to change its status indicator from "TENTATIVE" to "LIVE." In some implementations, the status indicator of the reference R serves like a lock to the reference R in the tablet descriptor file D(T) to deny a client request for a target file through a particular reference R if the reference's status indicator is not "LIVE."

FIG. 3B is a flow chart illustrating how to create a new reference to an existing target file that belongs to a tablet in accordance with some implementations. Using the same example, the server gets (321) the tablet descriptor file D(T) of the tablet T and then generates (323) a new global unique identifier "guid" for the new reference to the target file X. The server creates (325) a new reference R for the target file X, which may include the following attributes {Status=TENTATIVE, Target_Name=X, Ref_Name=X.ref.<guid>}. As noted above, the naming convention of the global unique identifier <guid> guarantees that the new reference is different from the previous reference created in connection with the creation of the target file X in the file system. Next, the server adds (327) the new reference R to the tablet descriptor file D(T) and creates an empty reference file in the file system using the reference file name Ref_Name. Finally, the server updates (329) the reference R to change its status indicator from "TENTATIVE" to "LIVE," making the reference R available to the requesting client.

FIG. 3C is a flow chart illustrating how to remove a reference to an existing target file that belongs to a tablet in accordance with some implementations. Using the same example, the server gets (341) the tablet descriptor file D(T) of the tablet T and then identifies (343) a reference R for the target file X in the tablet descriptor file D(T). In some implementations, the server request a request for removing the reference from the tablet descriptor file D(T) and the request includes an identifier associated with the reference to be removed. As an initial step of removing the reference, the server updates (345) the status indicator of the reference R from "LIVE" to "TO-DELETE." As noted above, the status indicator serves like a lock to the reference R such that any subsequent access to the reference R may be denied as a result of the change of status. After identifying the reference file name in the reference R, the server deletes (347) the reference file corresponding to the reference R from the file system.

Next, the server checks (349) whether there is any other existing reference to the target file X. In some implementations, the server performs this operation by checking whether there is any reference file in the file system including the file name of the target file X. If so (349—Yes), the server stops taking further actions. Otherwise (349—No), the server determines that all the references to the target file X have been deleted, which renders the target file X obsolete. As such, the removal of the target file X from the file system is assumed to have no impact on the performance of the distributed storage system 100. Accordingly, the server deletes (351) the target file X from the file system. The server also deletes (353) the file name "X" and all the references to the file name "X" (whose status indicators are presumably "TO-DELETE") from the tablet descriptor file D(T).

Figure 4:
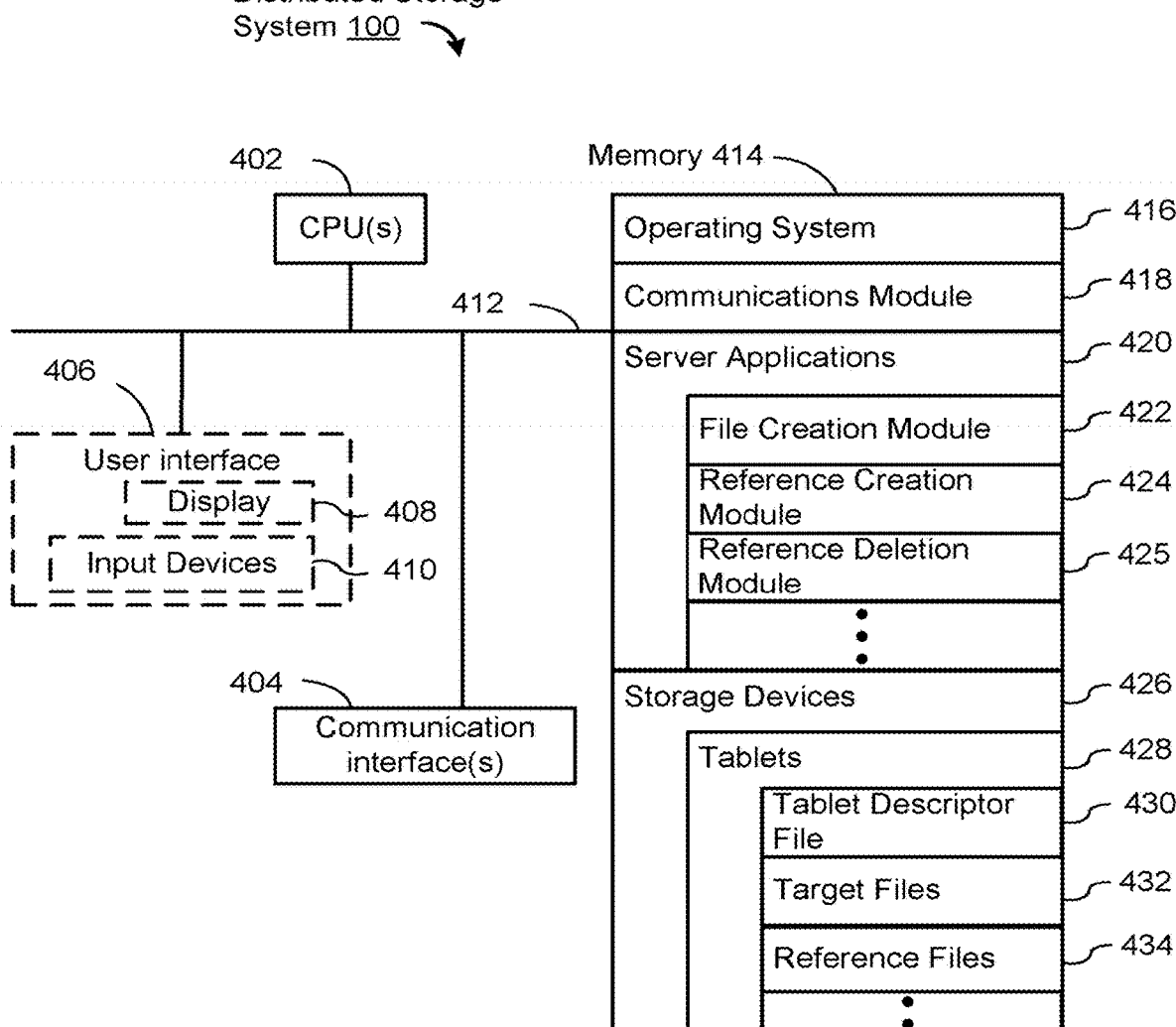
FIG. 4 is a block diagram illustrating the components of the distributed storage system in accordance with some implementations.

FIG. 4 is a block diagram illustrating the components of the distributed storage system 100 in accordance with some implementations. The distributed storage system 100 includes one or more processing units (CPU's) 402 for executing modules, programs and/or instructions stored in the memory 414 and thereby performing processing operations; one or more network or other communications interfaces 404; memory 414; and one or more communication buses 412 for interconnecting these components. In some implementations, the distributed storage system 100 includes an optional user interface 406 comprising a display device 408 and one or more input devices 410 (e.g., keyboard or mouse or remote control). In some implementations, the memory 414 includes high-speed random access memory, such as DRAM, SRAM, DDR RAM or other random access solid state memory devices. In some implementations, memory 414 includes non-volatile memory, such as one or more magnetic disk storage devices, optical disk storage devices, flash memory devices, or other nonvolatile solid state storage devices. In some implementations, memory 414 includes one or more storage devices remotely located from the CPU(s) 402. Memory 414, or alternately the non-volatile memory device(s) within memory 414, comprises a non-transitory computer readable storage medium. In some implementations, memory 414 or the non-transitory computer readable storage medium of memory 414 stores the following elements, or a subset of these elements, and may also include additional elements:

an operating system 416 that includes procedures for handling various basic system services and for performing hardware dependent tasks;

a network communications module 418 that is used for connecting the distributed storage system 100 to other devices (e.g., the clients 130) via the communication network interfaces 404 and one or more communication networks (wired or wireless), such as the Internet 120, other wide area networks, local area networks, metropolitan area networks, and so on;

one or more server applications 420, each server application further including a file creation module 422 as described above in connection with FIG. 3A, a reference creation module 424 as described above in connection with FIG. 3B, and a reference deletion module 425 as described above in connection with FIG. 3C; and one or more storage devices 426, each storage device including a plurality of tablets 428 and each tablet further including a tablet descriptor file 430, one or more target files 432 and one or more reference files 434.

Reference has been made in detail to implementations, examples of which are illustrated in the accompanying drawings. While particular implementations are described, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. For example, it is possible for the set top box to send raw audio signal to the TV content recognition server, which is then responsible for converting the audio signal into audio fingerprints. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of storing data, comprising:
at a computer server in a distributed storage system, the computer server including one or more processors and memory:
receiving a request to add a target data record to a data unit;
generating a globally unique identifier for the target data record;
creating the target data record in the distributed storage system;
creating a reference for the target data record with at least one attribute pointing to the target data record; and
adding a second reference to the target data record by:
generating a second globally unique identifier for the second reference to the target data record;
creating a second reference for the target data record with at least one attribute pointing to the target data record; and
making the second reference available to requesting clients.

2. The method of claim 1, further comprising adding the reference to a list of references in the distributed storage system.

3. The method of claim 1, wherein reference is created in response to a request to access the target data record.

4. The method of claim 1, wherein the globally unique identifier includes an address of the computer server and a timestamp generated by the computer server.

5. The method of claim 1, wherein the reference for the target data record includes a status, an identifier for the target data record, and a reference name.

6. The method of claim 1, further comprising assigning a status indicator of TENTATIVE to the reference before the target data record is created.

7. The method of claim 6, further comprising updating the status indicator for the reference to LIVE when the target data record is created in the distributed storage system.

8. The method of claim 7, further comprising denying a client request for the target data record through the reference when the status indicator for the reference is not LIVE.

9. A computer server in a distributed storage system, comprising:

memory; and one or more processors in communication with the memory and configured to:

receive a request to add a target data record to a data unit;

generate a globally unique identifier for the target data record;

create the target data record in the distributed storage system;

create a reference for the target data record with at least one attribute pointing to the target data record; and add a second reference to the target data record by:

generating a second globally unique identifier for the second reference to the target data record;

creating a second reference for the target data record with at least one attribute pointing to the target data record; and making the second reference available to requesting clients.

10. The computer server of claim 9, wherein the one or more processors are configured to add the reference to a list of references in the distributed storage system.

11. The computer server of claim 9, wherein the reference is created in response to a request to access the target data record.

12. The computer server of claim 9, wherein the globally unique identifier includes an address of the computer server and a timestamp generated by the computer server.

13. The computer server of claim 9, wherein the reference for the target data record includes a status, an identifier for the target data record, and a reference name.

14. The computer server of claim 9, wherein the one or more processors are further configured to assign a status indicator of TENTATIVE to the reference before the target data record is created.

15. The computer server of claim 14, wherein the one or more processors are further configured to update the status indicator for the reference to LIVE when the target data record is created in the distributed storage system.

16. The computer server of claim 15, wherein the one or more processors are further configured to deny a client request for the target data record through the reference when the status indicator for the reference is not LIVE.

* * * * *